Jan. 5, 1971   JEAN-PIERRE A. PUGNAIRE ETAL   3,552,199
MOMENT TRANSDUCER
Filed Oct. 17, 1968   2 Sheets-Sheet 1
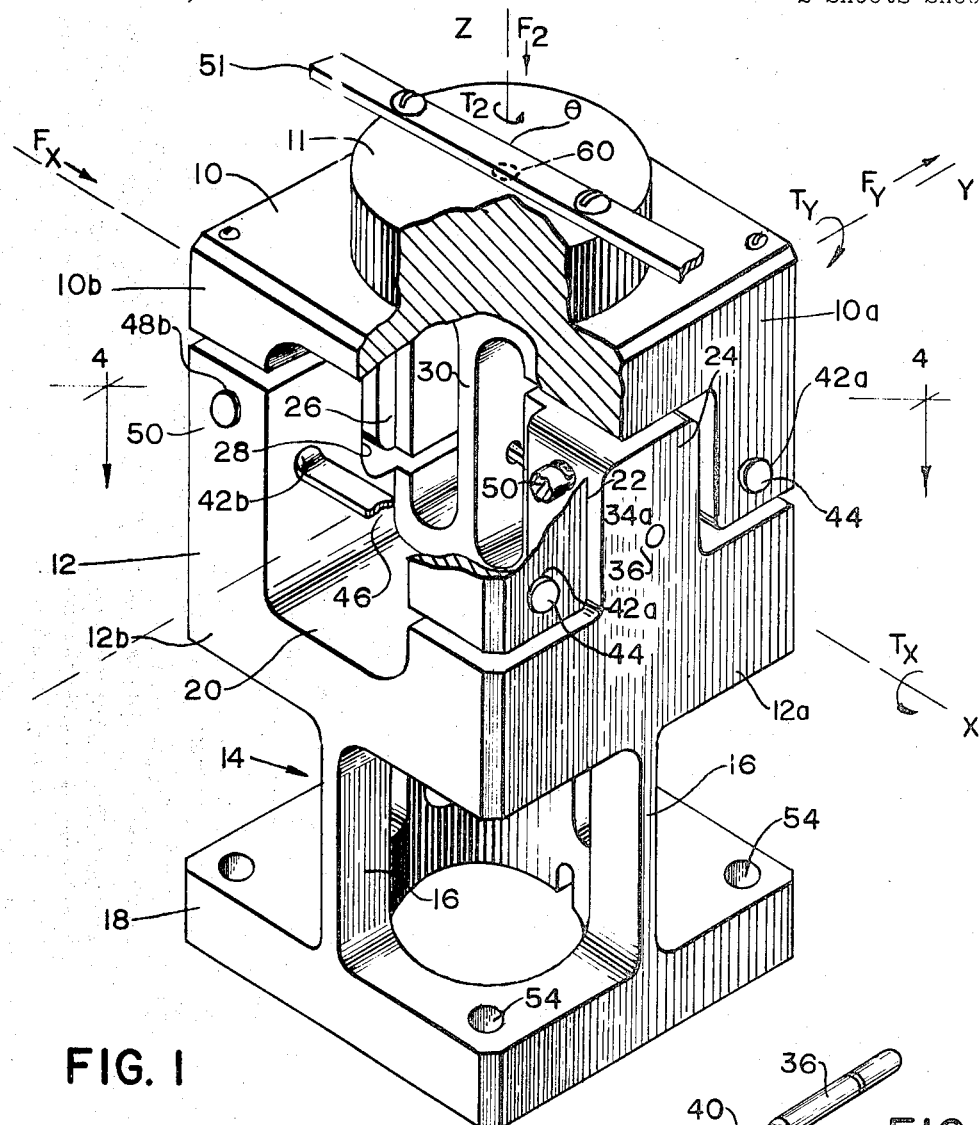
FIG. 1
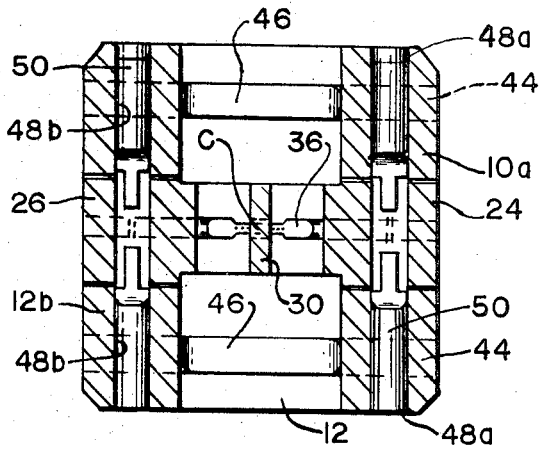
FIG. 4
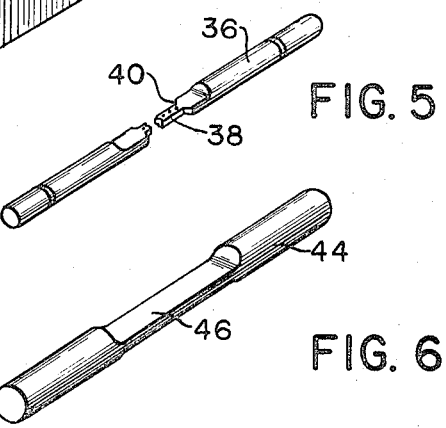
FIG. 5
FIG. 6
INVENTORS
JEAN-PIERRE A. PUGNAIRE
HERMAN W. ERICHSEN
BY
Blair, Cesari & St.Onge
ATTORNEYS United States Patent Office 3,552,199
Patented Jan. 5, 1971

3,552,199
MOMENT TRANSDUCER
Jean-Pierre A. Pugnaire, Arlington, and Herman W. Erichsen, Dedham, Mass., assignors to Bytrex, Inc., Waltham, Mass.
Filed Oct. 17, 1968, Ser. No. 768,236
Int. Cl. G01l 1/22, 1/26
U.S. Cl. 73—141                               6 Claims

ABSTRACT OF THE DISCLOSURE

A transducer for measuring differences in masses or the moment product by a large mass employs a floating head and a stationary body connected by way of an elastic support beam which is relatively easily bendable in only one direction when a bending moment is applied to the floating head. A gaging beam loaded with strain sensors extends perpendicularly through an opening at the geometrical center of the support beam. One end of the gaging beam is connected to the floating head and its other end is connected to the stationary body. In response to an applied moment, the floating head rotates about a point at the intersection of the two beams and subjects the gaging beam to a pure bending moment. The characteristics of the two beams are selected so that the energy absorbed by the gaging beam is relatively small compared to the energy absorbed by the support beam. Yet the stress produced thereby is quite large, thereby maximizing the transducer output.

The transducer is relatively unresponsive to spurious forces and moments and the transducer is also protected against overload. In addition, a closed bellows system minimizes oscillations in the transducer.

BACKGROUND OF THE INVENTION

This invention relates to a strain gage type transducer. It relates more particularly to a load cell for sensing very small differences in masses or moments.

The present apparatus has a wide variety of applications: it may be used to measure unbalance of the elements of a rotary assembly, e.g. turbine blades; it can be used as a mass comparator or simply as an extremely sensitive and accurate analytical balance.

Prior transducers of this type are disadvantaged because their sensitivity is rather small. Also, the prior apparatus may respond to unwarranted spurious forces and motions which introduce inaccuracies into the measurement.

SUMMARY OF THE INVENTION

It is an object of the present invention to provide an improved transducer for sensing bending moments.

Another object of the invention is to provide an improved transducer capable of measuring very small mass differences.

Still another object of the invention is to provide a transducer which is relatively insensitive to vertical and side thrusts exerted in conjunction with the moment being measured.

Yet another object of the invention is to provide a load cell which has a relatively small size for a given load-bearing capacity and yet is extremely accurate.

Still another object of the invention is to provide a load cell which is protected against overload.

A further object of the invention is to provide a bending moment load cell which is relatively free of oscillations.

Another object of the invention is to provide an extremely sensitive and precise strain gage analytical balance.

Other objects of the invention will in part be obvious and will in part appear hereinafter.

The invention accordingly comprises the features of construction, combinations of elements and arrangement of parts which will be exemplified in the constructions hereinafter set forth, and the scope of the invention will be indicated in the claims.

In general, my transducer employs a floating head connected to a stationary body by way of a vertically oriented elastic support beam whose longitudinal axis corresponds to the longitudinal axis of the transducer as a whole, i.e. the Z axis.

A gaging beam carrying strain gages extends loosely through an opening at the geometrical center of the support beam. This second beam is perpendicular to the support beam, i.e. along the X axis, and its two ends are connected to portions of the floating head and body, respectively, spaced on each side of the support beam.

When a bending moment is applied to the floating head, the support beam bends through a small angle about the transverse center line of the support beam, i.e. the Y axis. Also, since the gaging beam is centered on the support beam, for small deflection angles $\theta$, only a pure bending moment is applied to it as well as it, too, bends through the same angle to match the slope between head 10 and body 12. Thus, the gaging beam gages the deflection of the support beam.

The support beam is considerably larger and stiffer than the gaging beam. Therefore, almost all of the input energy is absorbed by the support beam as it bends. At the same time, it has relatively little stress in response to the input load and therefore undergoes minimal deflection. On the other hand, the much shorter gaging beam has a relatively high stress, although it absorbs an insignificant amount of energy, thereby maximizing the output of the strain gages associated with it.

A pair of flexure members are arranged parallel to the gaging beam on each side thereof at the transverse center line of the support beam. One end of each flexure member is connected to the floating head, the other end of each member is connected to the stationary body. The flexure members are long compared to the gaging beam and their axial stiffness is relatively high so that they are compliant in the XZ plane, but resist X axis forces and torques about the Z axis. Also, they are designed to absorb a minimum portion of the input energy. Consequently, the flexures operate to make the transducer relatively insensitive to all undesirable forces and moments, yet they do not detract appreciably from sensitivity to the input moment being measured.

If the capacity of the transducer is relatively low, overload stops are provided to protect it. Also, the transducer includes a bellows-type damping system to be described in detail later to minimize oscillations in the system.

BRIEF DESCRIPTION OF THE DRAWINGS

For a fuller understanding of the nature and objects of the invention, reference should be had to the following detailed description taken in connection with the accompanying drawings, in which:

FIG. 1 is an isometric view of a transducer embodying the principles of my invention;

FIG. 4 is a sectional view along line 4—4 of FIG. 1;

FIG. 5 is a perspective view with portions cut away of the gaging beam used in the FIG. 1 system;

FIG. 6 is a similar view of a flexure member used in the FIG. 1 system; and

DESCRIPTION OF THE PREFERRED EMBODIMENT

Figure 2:
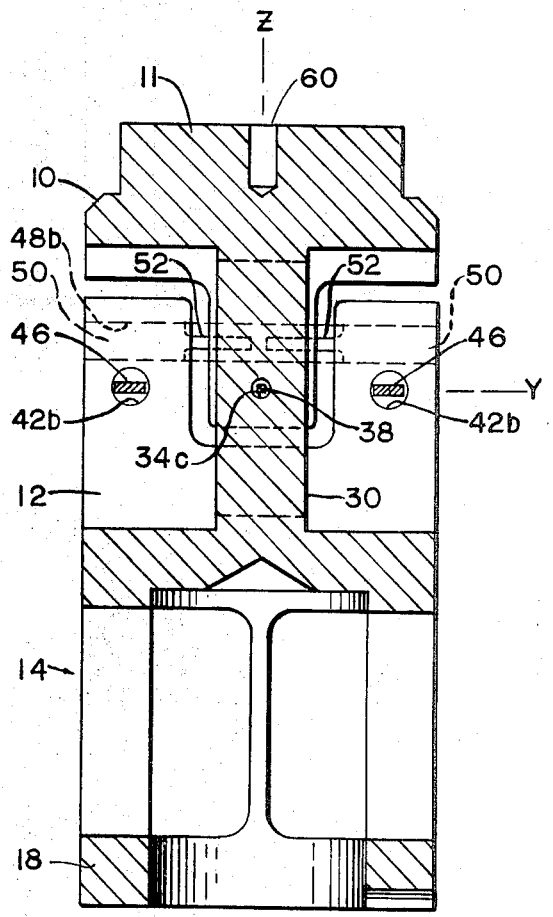
FIG. 2 is a medial section along the Y axis of the transducer shown in FIG. 1.

Referring now to FIG. 1 of the drawings, the major elements of the present transducer may be formed from a single block of metal and the transducer is oriented as indicated with respect to perpendicular axes X, Y and Z. The transducer comprises a floating head 10 whose top surface is milled out to form a generally discoid cap 11. Head 10 floats on a stationary body 12 which, in turn, is supported by a squirrel cage arrangement 14 composed of four legs 16 extending up to body 12 from a rigid rectangular base 18.

Head 10 and body 12 interfit so that together they form a generally rectangular enclosure having a window or passage 20 through it running parallel to the Y axis. Specifically, head 10 has a depending side 10a which contains a vertically oriented, rectangular groove 22. Groove 22 loosely receives a tongue 24 projecting up from side 12a of body 12. The opposite side 10b of head 10 is formed with a depending tongue 26 which extends down loosely into a rectangular groove 28 in side 12b of body 12.

An upstanding, generally rectangular, integral, elastic support beam 30 connects head 10 and body 12. In the drawings, the transducer is oriented so that the three rectangular axes of support beam 30 coincide with X, Y and Z axes. The shortest dimension of beam 30 lies on the X axis and the transducer measures torques or moments about the Y axis. There is enough clearance between the various edges of head 10 and body 12 to allow the head to rotate relative to body 12 in response to these input movements.

Figure 3:
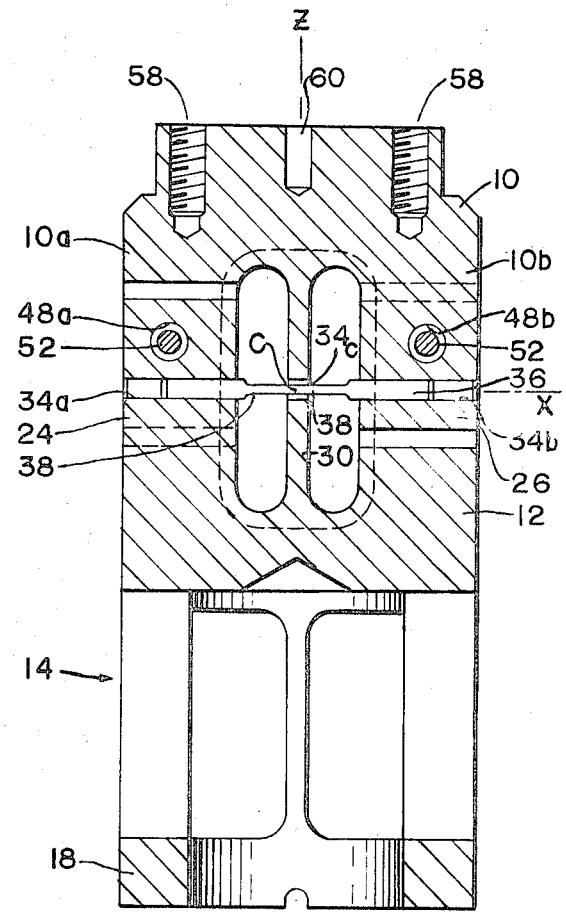
FIG. 3 is a medial section along the X axis thereof, with the portions shown in elevation.

As best seen in FIG. 3, a lateral passage extends through the transducer coaxial with the X axis. This passage comprises a segment 34a through tongue 24, a segment 34b through tongue 26 and, finally, a segment 34c through support beam 30. The center of passage segment 34c coincides with the geometrical center C of support beam 30. A gaging beam 36 is disposed in passage segments 34a–34c and is cemented or otherwise secured at its ends to tongues 24 and 26.

As best seen in FIG. 5, gaging beam 36 is a generally cylindrical rod having a constricted midportion 38 with a square cross section. Midportion 38 constitutes the effective bending length of beam 36. A series of strain gages 40 are secured to midportion 38 and these generate the output from the transducer.

Turning to FIG. 4, gaging beam 36 is positioned so that it is precisely centered on the geometrical center C of beam 30 with equal length portions of midportion 38 lying on each side of support 30. Also, as shown in FIG. 2, there is appreciable clearance between midportion 38 and the wall of passage segment 34c.

Turning to FIGS. 1, 2 and 4, a pair of passages extend through the transducer parallel to, and spaced equally on each side of, gaging beam 36. Each such passage has a segment 42a extending through side 10a of head 10 and a second segment 42b extending through side 12b of body 12. A pair of identical flexure members 44 extending through these passages are secured at their ends to head side 10a and body side 12b.

As best seen in FIG. 6, each flexure member 44 is a flexible and resilient rod whose midportion 46 has a generally rectangular cross section. The flexure members 44 are positioned in the transducer as shown in FIGS. 1 and 2 so that the wide faces of their midportions 46 lie in horizontal planes. In this, they allow head 10 to rotate about the Y axis, but they inhibit movements of head 10 in other directions as will be described in more detail later. As with support beam 36, each flexure member 44 is symmetrical about the ZY plane.

Referring now to FIGS. 1, 3 and 4, a pair of passages 48a and 48b extend through the transducer parallel to its Y axis and just above flexure members 44. Passages 48a extends through head side 10a as well as tongue 24, while passage 48b extends through body side 12b and tongue 26. Four identical pins 50 are secured in passages 48a and 48b. Each pin has an undercut portion 52, pins are force fitted into holes 48a and 48b in the portion which lies only in head side 10a and body side 12b, but provide a clearance in the portions extending through tongues 24 and 26. The pins 50 act thus as limit stops to protect the transducer as will be described in detail later.

During operation of the system, an input moment is applied to head 10, such as by way of a lever arm 51, giving rise to a torque $T_y$ (FIG. 1). The input to head 10, being symmetric about the X and Y axes, is a pure bending moment. Therefore, beam 30 deflects with a constant radius of curvature through angle $\theta$ about the Y axis.

Beam 30, while relatively compliant about the Y axis, is axially very stiff. Consequently, it absorbs almost all of the input energy in the form of strain energy as it rotates.

Beam 36, being connected between head 10 and body 12, bends through the same angle $\theta$. Since beam 36 is centered on beam 30, for relatively small deflection angles, substantially no axial, i.e. X axis, forces are transmitted to beam 36. Consequently, the input to beam 36 is also a pure bending moment.

The gaging beam 36 has a relatively small cross section in its midportion 38 and thus absorbs relatively little input energy. Yet the short length of the midportion 38, together with the fact that this portion is deflected through the same angle as the support beam 30, provides a much larger stress in the portion 38. This enhances the outputs of the strain gages 40 affixed to the portion 38.

Thus, in one sense, beam 36 gages the reflection of the beam 30 in response to the input moment. Because of the stress multiplying relationship between these two beams, the gages 40 on beam 36 provide greater sensitivity to the input moment than would strain gages affixed directly to the beam 30.

At the same time, gages 40 are largely isolated from spurious forces and moments. More particularly, as mentioned previously, beam 30 is stiff in the Z direction and about the X axis. Beam 36, on the other hand, is stiff in the X direction. Flexure members 44 are made relatively long compared to beam 36 and are also very stiff in the X direction. On the other hand, they are "soft" in the Z direction and about the Y axis so as not to absorb stress when head 10 deflects about the Y axis. Thus, strain gages 40 are unresponsive to all inputs except the $T_y$ input which is the one being measured by the system.

The capacity of a given transducer made in accordance with this invention may be relatively low, e.g. 5 oz.-in. full scale. Therefore, pins 50 are provided as overload stops. As shown in FIG. 3, the portions 52 of pins 50 are spaced from the walls of passages 48a and 48b in tongues 24 and 26. As head 10 rotates relative to body 12, the portions 52 eventually contact these walls making a rigid connection between head 10 and body 12 and thereby carrying the input moment directly from head 10 to body 12. Since pins 50 are very rigid compared to support beam 30, no additional stress is imparted to support beam 30 once pins 50 make contact. The clearance between the portions 52 and tongues 24 and 26 is selected so that they become effective at torques somewhat below the level which would damage the system.

Referring to FIG. 1, squirrel cage 14 is included in the transducer to give it some torsional flexibility about the Z axis, a direction in which the system would otherwise be very rigid. Thus, inputs in this direction are absorbed by squirrel cage 14 rather than being transmitted to the sensing portion of the transducer. Moreover, this added torsional flexibility makes it practical to equip the transducer with external torsional overload stops (not shown) which engage lever arm 51 to prevent excessive stresses from being imparted to the sensing section, and thus add to the ruggedness of the overall system. For all other inputs, however, squirrel cage 14 is quite rigid.

The overall area of base 18 is relatively large so that the transducer can be mounted to a flat support on which the aforesaid overload stops may be installed. Bolt holes 54 are provided in base 18 for this purpose.

The transducer is usually fitted with a rigid, box-like cover (not shown) which engages over head 10 and body 12. In lieu of lever arm 51, the cover is secured to cap 11 by means of bolts screwed into threaded openings 58 therein. Suitable arms for mounting fixtures, or balance arms, are secured to the sides of this box. In order to limit transducer sensitivity largely to moments about the Y axis and thus minimize sensitivity to spurious inputs, it is important that these fixtures be arranged to apply the input force couple to the head 10 in the XZ plane. A center pin 60 in the top of cap 11 indicates the X and Y coordinates of point C. The balance arms should, therefore, extend out along the X axis from the point C.

Figure 7:
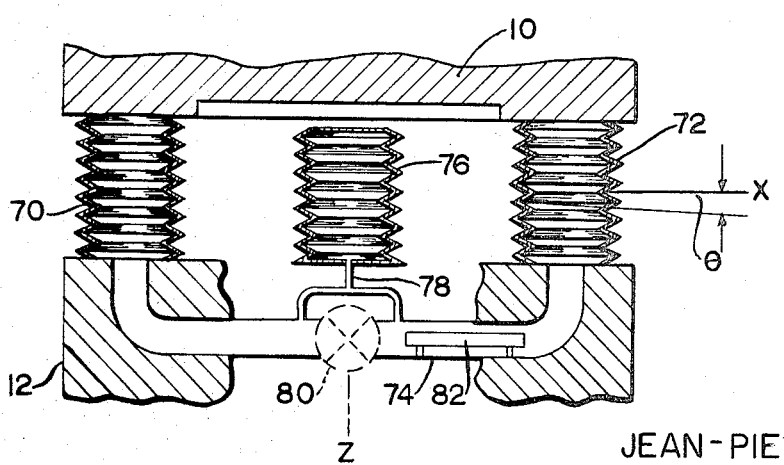
FIG. 7 is a schematic diagram of an oscillation damping system used in my transducer.

Referring now to FIG. 7, in order to improve its operation, the present transducer may include a viscous damping system which efficiently damps out oscillations, yet has a minimum effect on the output of the transducer. The damping system includes a pair of very compliant bellows 70 and 72 fastened between floating head 10 and stationary body 12 so that they are located symmetrically with respect to the X axis and so that an angular displacement θ of head 10 relative to body 12 causes compression of one bellows and extension of the other bellows. A fluid passage 74 extends between the two bellows 70 and 72 so that fluid is able to flow back and forth between them.

A third similar bellows 76 is hydraulically connected to bellows 70 and 72 by way of a very small diameter passage 78 leading to passage 74. Bellows 76 provides for thermal expansion within the system as will be described presently. The entire hydraulic system composed of bellows and fluid passages is completely filled with a suitable hydraulic fluid such as silicone oil.

When floating head 10 rotates clockwise through angle θ relative to body 12 in response to an input moment, bellows 72 is compressed whereas bellows 70 is extended and oil, therefore, flows from bellows 72 through passage 74 to bellows 70. The resulting viscous forces in the passage 74 provide the desired damping, which in the arrangement shown is true viscous damping for the transducer. The damping constant can be tailored by altering such parameters as the viscosity of the liquid or the relative diameters of the bellows 70 and 72 on the one hand and the passage 74 on the other.

Still referring to FIG. 7, the third bellows 76 allows for expansion of the oil with temperature. Since this is a closed system, in the absence of bellows 76, expansion of the oil would produce large forces at both bellows 70 and 72 due to an increase in pressure. The oil passage 78 leading to bellows 76 is made extremely small in relation to passage 74 so that it appears as a very high fluid resistance to the high velocity flow of oil associated with the angular rotation of head 10 in response to an input load. Consequently, the effect of bellows 76 on the damping function of the system is negligible. On the other hand, this bellows and the passage 78 readily accommodate the normally slow flow of oil which occurs due to temperature changes.

The damping constant of the illustrated system can easily be adjusted simply by regulating the flow of oil through passage 74. An adjustable fluid valve 80 shown in dotted lines FIG. 7 can perform this function. This feature allows one to maintain constant damping when measuring moments due to different masses.

Actually, in some applications, valve 80 may be controlled automatically by the amount of mass being moment weighed. For this, body 12 is made relatively compliant in the Z direction so that there is some relative movement of body 12 relative to base 18 due to the mass being moment weighed. With valve 80 mounted to move with body 12, a control rod extending from base 18 to the control element of the valve adjusts the valve according to the mass applied to the transducer. In this way, the transducer provides substantially constant damping for the different masses being weighed.

Also, if desired, provision may be made for compensating the FIG. 7 damping system for changes in temperature. More particularly, a solid rod 82 may be positioned within passage 74. If the walls of passage 74 are made of a low expansion alloy such as Invar and rod 82 is made of a relatively high expansion material such as nylon, the effective cross sectional area of passage 74 will decrease with an increase in temperature. This tends to compensate for the decrease in viscosity of the oil flowing through passage 74 due to an increase in temperature. In this way, critical damping can be maintained despite changes in the temperature in the area in which the transducer is being used.

It will be seen from the foregoing then that my transducer yields an accurate measurement of very small differences in masses or in the moment produced by relatively large masses. Thus, the system can measure very accurately the unbalance of structural members such as turbine blades or it may be used as a mass comparator or an analytical balance.

The transducer is designed particularly for use with strain gage sensors because it maximizes the output of the sensors for a given input moment applied to the transducer. In addition, the transducer is designed to make the sensors relatively unresponsive to other unwanted inputs to the system. The transducer also includes provision for protecting it against an overloaded condition. Finally, the transducer has a unique viscous damping system which may be adjusted depending upon the masses being moment weighed or compared so that the transducer quickly yields a clear and accurate measurement.

It is to be understood that the following claims are intended to cover all of the generic and specific features of the invention herein described, and all statements of the scope of the invention which, as a matter of language, might be said to fall therebetween.

I claim:
1. An improved moment transducer comprising:
 (A) a floating head,
 (B) a stationary body,
 (C) an elastic support beam
  (1) connected between said head and body so that said head can rotate somewhat about an axis through said support beam, and
  (2) arranged to absorb a maximum amount of energy as said head rotates about said axis,
 (D) an elastic gaging beam,
  (1) connected between said head and body,
  (2) passing through an opening in said support beam, and
  (3) centered on said axis so that when said head is rotated about said axis in response to an input torque
   (a) substantially only a pure bending moment is applied to said gaging beam, and
   (b) said gaging beam is stressed to a maximum extent, and
 (E) strain sensors affixed to said gaging beam whose output reflects the amount of deflection of said support beam.

2. An improved moment transducer as defined in claim 1 and further including flexures
  (A) connected between said head and body,
  (B) arranged to bend readily about said axis, and
  (C) being stiff in the direction parallel to the axis of said gaging beam.

3. An improved moment transducer as defined in claim 1 and further including overload stop means for limiting the deflection of said head relative to said body.

4. An improved moment transducer as defined in claim 3 wherein said stop means comprise rigid pins
  (A) extending between said head and body substantially parallel to said axis, and
  (B) arranged to make rigid contact between said head and body when the former deflects through a selected angle.

5. An improved moment transducer as defined in claim 1 and further including means for damping oscillations of said head relative to said body.

6. An improved moment transducer as defined in claim 5 wherein said damping means includes
  (A) a pair of bellows connected between said head and body on opposite sides of said axis,
  (B) a fluid passage between said bellows, and
  (C) fluid filling said hollows and passage so that deflection of said head about said axis causes fluid to flow between said bellows, and
  (D) means for controlling the fluid flow so as to regulate the angular velocity of said head as it deflects.

References Cited
UNITED STATES PATENTS

| | | | |
|---|---|---|---|
| 3,279,246 | 10/1966 | Seasholtz | 73—141 |
| 3,371,526 | 3/1968 | Fathauer | 73—141 |
| 3,394,970 | 7/1968 | Tracy | 308—2 |

CHARLES A. RUEHL, Primary Examiner

U.S. Cl. X.R.

177—211; 308—2